(12) United States Patent
Van Den Beukel

(10) Patent No.: US 10,278,358 B2
(45) Date of Patent: May 7, 2019

(54) SYSTEM AND METHOD FOR MANAGING DAIRY ANIMALS

(71) Applicant: LELY PATENT N.V., Maassluis (NL)

(72) Inventor: Huibrecht Johannes Arjen Van Den Beukel, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 282 days.

(21) Appl. No.: 15/504,695

(22) PCT Filed: Aug. 11, 2015

(86) PCT No.: PCT/NL2015/050573
§ 371 (c)(1),
(2) Date: Feb. 17, 2017

(87) PCT Pub. No.: WO2016/032325
PCT Pub. Date: Mar. 3, 2016

(65) Prior Publication Data
US 2017/0231187 A1     Aug. 17, 2017

(30) Foreign Application Priority Data

Aug. 29, 2014   (NL) ...................................... 2013390

(51) Int. Cl.
*A01K 11/00* (2006.01)
*A01J 5/007* (2006.01)
(Continued)

(52) U.S. Cl.
CPC ................. *A01J 5/007* (2013.01); *A01K 1/10* (2013.01); *A01K 1/12* (2013.01); *A01K 11/006* (2013.01);
(Continued)

(58) Field of Classification Search
CPC ........ A01K 1/12; A01K 11/06; A01K 1/0209; A01K 11/008; A01K 11/004;
(Continued)

(56) References Cited

U.S. PATENT DOCUMENTS

| 4,854,328 A * | 8/1989 | Pollack | ................ | A61B 5/0008 |
| | | | | 600/549 |
| 2009/0009289 A1* | 1/2009 | Simon | .................. | A01K 11/004 |
| | | | | 340/10.1 |
| 2018/0146645 A1* | 5/2018 | Arbel | ..................... | A61B 5/103 |

FOREIGN PATENT DOCUMENTS

| EP | 0 332 231 A2 | 9/1989 |
| WO | WO 2004/068940 A1 | 8/2004 |
| WO | WO 2010/021540 A1 | 2/2010 |

* cited by examiner

*Primary Examiner* — Kristen C Hayes
(74) *Attorney, Agent, or Firm* — Birch, Stewart, Kolasch & Birch, LLP

(57) ABSTRACT

A system for managing a group of dairy animals includes a dwelling space, such as an animal shed, in which the dairy animals can roam. A dairy animal-related device for performing a dairy animal-related operation is arranged in the dwelling space. The dairy animals in the dwelling space can walk to the dairy animal-related device through the dwelling space. A luring system includes luring devices, each of which is attached to in each case one of the dairy animals. The luring device of each dairy animal is activatable in order to give said dairy animal a luring signal so as to lure said dairy animal to the dairy animal-related device. A detection system is configured for detecting the position of each individual dairy animal in the dwelling space. The luring system is connected to the detection system for receiving the positions of the dairy animals in the dwelling space detected by the detection system. On the basis of the received detected positions of the dairy animals in the dwelling space, the number of dairy animals is determined which are situ- (Continued)

Figure 1:
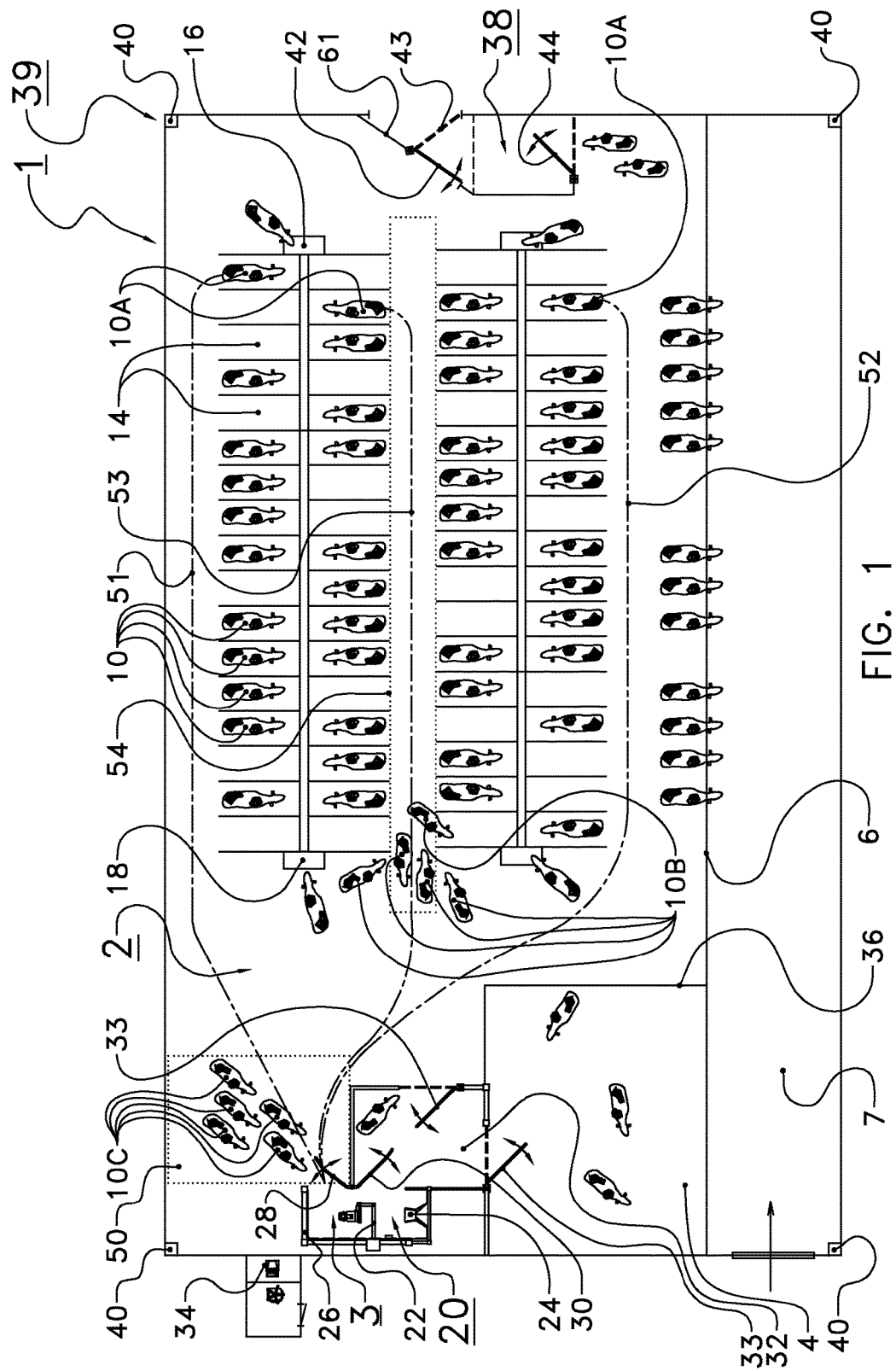

ated in a predetermined area of the dwelling space adjacent to the dairy animal-related device. The luring system activates the luring device of one of the other dairy animals depending on said number of dairy animals situated in said area.

20 Claims, 2 Drawing Sheets

(51) Int. Cl.
    *A01K 1/12*     (2006.01)
    *A01K 15/02*     (2006.01)
    *A01K 1/10*     (2006.01)
    *A01K 27/00*     (2006.01)
    *A01K 29/00*     (2006.01)

(52) U.S. Cl.
    CPC ............ *A01K 15/02* (2013.01); *A01K 27/009* (2013.01); *A01K 29/00* (2013.01)

(58) Field of Classification Search
    CPC .. A01K 1/0029; A01K 11/001; A01K 11/006; A01J 5/007; A01J 7/00
    See application file for complete search history.

SYSTEM AND METHOD FOR MANAGING DAIRY ANIMALS

The invention relates to a system and method for managing dairy animals, in particular cows.

EP332231 discloses an automatic milking device which is placed, for example, in an animal shed or field. The milking device is controlled by a computer. The dairy animals roam freely around the automatic milking device. The aim is for all dairy animals to regularly present themselves at the milking device in order to be milked. To this end, the dairy animals may be lured to the milking area by the presence of concentrate. However, it is also possible to call the dairy animals by means of audio signals. To this end, each dairy animal is provided with a collar which is fitted with a receiver which is connected to a loudspeaker which is situated in the vicinity of the ears of the dairy animal. The milking device comprises a computer-controlled transmitter, so that the computer can send a calling signal via the loudspeaker of the respective dairy animal. In this way, any desired dairy animal can be called by means of, for example, pleasant sounds to the milking area, as the dairy animal then knows that, for example, concentrate is present there. However, the occupancy rate of this automatic milking device is not at an optimum level.

It is an object of the invention to provide an improved system for managing dairy animals.

According to the invention, this object is achieved by a system for managing a group of dairy animals, comprising:
  a dwelling space, such as an animal shed, in which the dairy animals can roam, preferably can roam substantially completely freely,
  at least one dairy animal-related device for performing a dairy animal-related operation, wherein the dairy animal-related device is arranged in a fixed position in the dwelling space, and wherein the dairy animals in the dwelling space can walk to the dairy animal-related device through the dwelling space,
  a luring system with luring devices, each of which is attached to in each case one of the dairy animals, wherein the luring device of each dairy animal is activatable in order to give off a luring signal to said dairy animal, which is preferably only perceivable by said dairy animal, so as to lure said dairy animal to the dairy animal-related device,
  wherein the system is provided with a detection system which is configured to detect and/or follow the position and/or movement of each individual dairy animal in the dwelling space, and that the luring system is connected to the detection system for receiving the positions of the dairy animals in the dwelling space detected by the detection system, and that the luring system is configured to [intended is: determine (transl.)] on the basis of the received detected positions of the dairy animals in the dwelling space, the number of dairy animals which are situated in a predetermined area of the dwelling space adjacent to the dairy animal-related device, preferably at least during a predetermined period of time, and to activate the luring device of one of the other dairy animals, which is preferably a dairy animal outside the dairy animal-related device, for example a dairy animal which is desired and/or expected to walk to the dairy animal-related device, based on said number of dairy animals which are present in said area.

According to the invention, the detection system is configured to detect and/or follow the position and/or movement of each individual dairy animal which is situated in the dwelling space over time. For example, the positions of each of the dairy animals in the dwelling space are detected and stored in a memory of the detection system at regular intervals. Such a detection system forms a "cow locator" system.

On the basis of the detected position and/or movement of each dairy animal in the dwelling space, it is possible to determine how many dairy animals are situated in the predetermined area adjacent to the dairy animal-related device. The predetermined area is in particular a floor section of the dwelling space which adjoins the dairy animal-related device, wherein said floor section is connected, without partitions such as fencing and/or selection gate, to a further floor section of the dwelling space which adjoins said predetermined area. The predetermined area is an area of the dwelling space which the dairy animals can enter and exit freely. The predetermined area may, for example, be input into the luring system or be automatically determined by the luring system on the basis of a map of the dwelling space stored in the luring system. The dairy animals which are situated in the predetermined area or stay at least for a predetermined time period in said predetermined area are seen as dairy animals waiting at the dairy animal-related device by the system.

According to the invention, depending on the number of dairy animals waiting at the dairy animal-related device, one of the other dairy animals is called by means of a luring signal and made to go there. Although the other dairy animal may be an arbitrary dairy animal from the group of dairy animals, said other dairy animal is preferably a dairy animal which is desired and/or expected to be at the dairy animal-related device. In contrast with the above-described state of the art, wherein a dairy animal is called when said dairy animal is expected to be at the automatic milking device, irrespective of the number of animals at said milking device or the availability of the latter, according to the invention, the number of dairy animals which are waiting at the dairy animal-related device is taken into account. In other words, according to the invention, it is decided whether or not to lure a dairy animal to the dairy animal-related device based on the number of animals which are already present there or the availability of the diary stock-related device. In practice, the dairy animal-related device, such as an automatic milking device for automatically attaching milking cups to the teats of a dairy animal or another dairy animal-related device, will be quiet or even free one moment, but the next moment it may be surrounded by animals and/or a queue may have formed. By actively calling a dairy animal by means of the luring device according to the invention when the dairy animal-related device is free or expected to be available after a short wait, the use thereof will increase during quiet periods. As a result thereof, the occupancy rate of the dairy animal-related device increases. In addition, there will be fewer instances of dairy animals having to be collected in order to perform a dairy animal-related operation at a certain point in time and did not walk to the dairy animal-related device of their own accord.

The luring signal is a signal which the dairy animals associate with the animal-related device. Training animals to associate the luring signal with a specific animal-related device can be done in a variety of ways. For example, the association can be taught by emitting the luring signal to each dairy animal which voluntarily visits the respective dairy animal-related device. After a number of times, the dairy animal will have been conditioned in such a way that the dairy animal is stimulated by detecting the luring signal to walk to said dairy animal-related device. In this way, it is possible to condition all dairy animals of the group of dairy animals.

Incidentally, it is also possible to configure the luring system in such a way that it determines, on the basis of the received detected positions of the dairy animals in the dwelling space, the number of dairy animals which are situated within a predetermined distance from one of the dairy animals inside the predetermined area, and to activate the luring device of said other dairy animal depending on this number of dairy animals situated within a predetermined distance from the former. In this case, dairy animals are counted which are situated outside the predetermined area, but which join behind one or more of the dairy animals inside said area in such a way that said dairy animals collectively form a cluster of waiting dairy animals. As a result thereof, the system according to the invention functions in a more accurate way.

In an embodiment, the luring system is configured to determine whether the number of dairy animals situated inside said area, i.e. the number of waiting dairy animals, is smaller than a threshold value, wherein the luring system is furthermore configured to activate the luring device of one of the other dairy animals when the luring system determines that the number of dairy animals situated in said area is smaller than said threshold value. The threshold value is, for example, 0 or 1 or 2 or 3 or 4 or 5 dairy animals, preferably, the threshold value is a single or no dairy animal. The threshold value forms a predetermined maximum. If the number of dairy animals waiting at the dairy animal-related device is larger than the threshold value, the luring system does not activate any luring device, i.e. no dairy animal is being stimulated to walk to the dairy animal-related device. If the number of waiting dairy animals is smaller than the threshold value, i.e. the dairy animal-related device is quiet or even free, the luring system activates the luring device of one of the other dairy animals in order to lure said dairy animal to the dairy animal-related device. This stimulates the use of the dairy animal-related device during quiet periods.

In an embodiment, the luring system is configured to select the luring device of one of the other dairy animals from the group of dairy animals based on the number of dairy animals which block one or more possible routes or all possible routes from the position in the dwelling space at which said other dairy animal is situated to the dairy animal-related device. The luring system is configured to determine the number of blocking dairy animals along one or more possible routes based on the received detected positions of the dairy animals in the dwelling space. The luring system may, for example, on the basis of the position of said other dairy animal and a map of the dwelling space stored in the luring system, identify various routes to the dairy animal-related device and determine if one or more of these routes are locally blocked by dairy animals. If the luring system at some point determines that the dairy animal-related device is available in such a way that luring can take place, the luring system determines whether there are one or more dairy animals which have a substantially clear path to the dairy animal-related device. If this is the case, the luring system activates the luring device of one of these dairy animals, so that this dairy animal receives an incentive to walk to the dairy animal-related device. By analyzing whether the route to the dairy animal-related device is clear for the dairy animal when selecting that other dairy animal, there is a greater chance that this dairy animal will reach the dairy animal-related device unimpeded after having received the luring signal. In addition, this will reinforce the association between the luring signal and the dairy animal-related device.

The number of dairy animals which block one or more possible routes from the position in the dwelling space at which that other dairy animal is situated to the dairy animal-related device, can be determined in a variety of ways. For example, the luring system is configured to determine the number of blocking dairy animals by determining the number of dairy animals which are located in one or more predetermined areas of the dwelling space through which the one or more possible routes extend. In this case, it is possible for the luring system to distinguish between clusters of dairy animals which are gathered close together in groups.

According to the invention, it is preferred if each dairy animal is associated with a ranking parameter in the luring system, based on the ranking of that dairy animal within the group of dairy animals, wherein the ranking parameter of each dairy animal is, for example, stored in a memory of the luring system, and wherein the luring system is configured to determine, on the basis of the received detected positions of the dairy animals in the dwelling space, said number of dairy animals which are situated in a predetermined area of the dwelling space adjacent to the dairy animal-related device and the ranking parameter of each of these dairy animals, and to activate the luring device of one of the other dairy animals, preferably a dairy animal which is desired and/or expected to walk to the dairy animal-related device depending on said number of dairy animals situated in that area and/or the ranking parameter of these dairy animals and/or the ranking parameter of said other dairy animal. Each dairy animal is assigned a ranking parameter. When determining the number of dairy animals waiting in the predetermined area, the ranking parameters of these waiting dairy animals are determined at the same time. According to this preferred embodiment, when determining whether a luring signal can be emitted and/or when selecting said other dairy animal in order to send it the luring signal, the luring system takes the ranking parameter of said other dairy animal, the ranking parameters of the number of waiting dairy animals and/or the ratio thereof into account. As a result, the health of the group of dairy animals can be improved as the incentives to visit the dairy animal-related device can be given in such a way that all dairy animals of the group receive substantially the same treatment, irrespective of their ranking within this group. When the dairy animal-related device is available, the luring signal is given, for example, to a dairy animal with a ranking parameter which corresponds to a low ranking. While high-ranking dairy animals usually visit the dairy animal-related device sufficiently often of their own accord, the quiet periods at the dairy animal-related device are used in such a way according to this preferred embodiment, that also low-ranking dairy animals visit the dairy animal-related device sufficiently often.

In a specific embodiment, the luring system is configured to select the luring device of one of the other dairy animals from the group of dairy animals depending on the number of dairy animals which block one or more possible routes or all possible routes from the position in the dwelling space at which said other dairy animal is located to the dairy animal-related device and/or the ranking parameter of said number of blocking dairy animals and/or the ranking parameter of said other dairy animal. In this case, the luring system is configured to determine the number of blocking dairy animals along one or more possible routes on the basis of the received detected positions of the dairy animals in the dwelling space. In this case, not only are the ranking parameters of any dairy animals waiting at the dairy animal-related device taken into account, but the ranking parameters of the dairy animals which block one or more possible routes to the dairy animal-related device for said other dairy animal are also analyzed. If, for example, all possible routes for a dairy animal to be lured to the dairy animal-related device are blocked by a dominant dairy animal, there is a significant risk that said dairy animal, after having received the luring signal, will be frightened off or stopped by said dominant dairy animal on the way. By selecting a dairy animal which has a substantially clear route to the dairy animal-related device, the chance of said dairy animal actually reaching the dairy animal-related device is greater. This also increases the association between the luring signal and the dairy animal-related device.

According to the invention, the dairy animal-related device may be formed by different devices. In an embodiment, the dairy animal-related device comprises an automatic milking station for automatically milking a dairy animal. The automatic milking station is configured to attach milking cups to the teats of a dairy animal automatically. Each dairy animal has an individually determined milking parameter. The individually determined milking parameter is, for example, time-dependent, such as the time which has lapsed since the last milking of said dairy animal. The milking parameter of each dairy animal is stored in a memory of the system. A predetermined milking criterion is furthermore input into a memory of the system. The automatic milking station is configured to milk a dairy animal when the milking parameter of said dairy animal satisfies the milking criterion, wherein said other dairy animal whose luring device is activated is a dairy animal which has a milking parameter which satisfies the milking criterion. In this case, said other dairy animal is preferably the dairy animal from the group of dairy animals which has not been milked for the longest. The advantages of the invention become particularly apparent with the automatic milking station. The increasing occupancy rate of the automatic milking station and the fact that dairy animals which are to be milked have to be collected less frequently is particularly advantageous.

In an alternative embodiment, the system comprises an animal space which is separate from the dwelling space, wherein the dairy animal-related device comprises a selection device which connects the dwelling space and the animal space to each other and which is operable between a return position, in which a dairy animal, which has walked from the dwelling space to the selection device, is guided back through the selection device to the dwelling space, and a pass position, in which a dairy animal which has walked from the dwelling space to the selection device is guided through the selection space to the animal space. The animal space is formed, for example, by a grazing space. In this case, it is possible for each dairy animal to have a desired milking interval which is stored in a memory of the system and is determined by the desired time period between two successive milking operations of said dairy animal, and wherein each dairy animal has an expected lap time which is determined by the time period which said dairy animal is expected to spend in the animal space before said dairy animal returns to the dwelling space of its own accord, and wherein said other dairy animal is a dairy animal in the dwelling space for which the time remaining until the end of the milking interval lasts longer than the expected lap time. Preferably, said other dairy animal is the dairy animal in the dwelling space for which the time remaining until the end of the milking interval is longest.

According to this embodiment, a dairy animal receives a luring signal when the selection device is quiet in order to lure said dairy animal to the selection device, so that said dairy animal enters the animal space. In this case, the luring system selects a dairy animal which still has sufficient time to spend in the animal space before said dairy animal is expected to be back in the dwelling space again, for example in order to be milked. If the animal space is a grazing space, the dairy animals are thus outdoors more often, while the risk of the dairy animals not returning in time is limited.

In a specific embodiment, the luring device of each dairy animal comprises a time clock which is configured to activate said luring device when a time set in the time clock has expired in order to emit a luring signal to said dairy animal in order to lure said dairy animal back to the dwelling space, and wherein the selection device is configured to set the time clock of the luring device of said dairy animal to a time which depends on the expected lap time and/or on the time remaining until the end of the milking interval when a dairy animal is passed by the selection device from the dwelling space to the animal space. When the set time expires, the luring device emits the luring signal in order to stimulate the dairy animal to return to the dwelling space. As a result thereof, the dairy animals return to the dwelling space from the animal space in a timely manner. Incidentally, it is also possible to wirelessly send an activation signal to the dairy animal in order to lure the dairy animal back to the dwelling space at a desired time which is dependent on the time remaining to the end of the milking interval and/or of the expected lap time.

Incidentally, the invention is not limited to the abovementioned dairy animal-related devices. The system according to the invention may, for example, also be used with a concentrate station, a feeding fence, a cow brush or yet other dairy animal-related devices. In the case of a concentrate station, particularly a dairy animal which is deficient with regard to the intake of concentrate will be lured to the concentrate station.

If the dairy animal-related device comprises a feeding fence with feeding places, the luring system in particular may be configured to receive a fresh-feed signal after fresh feed has been provided at the feeding fence, and to activate the luring device of one of the other dairy animals, depending on the number of dairy animals which are situated in the predetermined area of the dwelling space adjacent to the feeding fence after a predetermined time period following the reception of the fresh-food signal and/or on the ranking parameter of each of these dairy animals and/or the ranking parameter of said other dairy animal. For example, the luring device of one of the other dairy animals is activated as soon as the luring system determines, after said predetermined time period, that the number of dairy animals which are situated in a predetermined area of the dwelling space adjacent to the feeding fence is smaller than a threshold value. Usually, the dominant dairy animals are the first to arrive at the freshly provided feed. Initially, therefore, the feeding fence is relatively busy with dominant dairy animals. Dairy animals of lower ranking usually stay at a distance in this case. After the dominant dairy animals have eaten, the luring system emits a luring signal to one of the other dairy animals to indicate that it has become quiet at the feeding fence. Said dairy animal is then stimulated to walk to the feeding fence, so that said dairy animal eats sufficient roughage.

In an embodiment, the system comprises a plurality of dairy animal-related devices for performing a dairy animal-related operation, in particular one or more of the above-described dairy animal-related devices, wherein the luring device of each dairy animal is activatable in order to emit mutually different luring signals to said dairy animal which are preferably only perceivable by said dairy animal so as to lure said dairy animal to in each case one of the dairy animal-related devices. Each dairy animal-related device is provided with an associated luring signal which differs from the luring signals of the other dairy animal-related devices. In other words, each dairy animal-related device has a unique luring signal, so that the dairy animals associate each signal with only one of the dairy animal-related devices. A dairy animal can be sent to a desired dairy animal-related device by emitting the associated luring signal. As a result thereof, the use of the various facilities in the dwelling space can be stimulated.

In an embodiment according to the invention, the luring system is configured to determine, based on the position of said other dairy animal detected over time, whether said other dairy animal is starting to move and/or is walking towards the dairy animal-related device within a predetermined time after the luring device of said other dairy animal has been activated, and wherein the luring system is configured to re-activate the luring device of said other dairy animal if the luring system determines, based on the position of said other dairy animal detected over time, that said other dairy animal has not started to move and/or is not walking towards the dairy animal-related device within said predetermined time. When it is detected that the called dairy animal has not started to move, the luring system may repeat the luring call. If said dairy animal still does not react after this second attempt, the luring system may activate, for example, the luring device of yet another dairy animal.

According to the invention, it is preferred if each luring device comprises a loudspeaker which is configured to emit a luring audio signal. Emitting a luring audio signal is efficient and technically readily feasible. The loudspeaker is for example attached to a collar around the neck of the dairy animal or to an ear tag which is provided on an ear of the dairy animal. In this case, the strength of the audio signal is preferably set in such a way that only the dairy animal to which said luring device is attached hears said audio signal. If the audio luring signal is only audible by the lured dairy animal to which said audio luring signal is emitted, only said dairy animal is called and not the other dairy animals. Incidentally, the luring devices may also be configured differently, for example in order to give off a vibration signal, electrical shock, pinching signal or stinging signal.

According to the invention, the detection system for detecting the position of each individual dairy animal in the dwelling space may be configured in different ways. Preferably, the detection system comprises a number of beacons, wherein each beacon is arranged at a fixed position in the dwelling space at a distance from the other beacons and wherein each beacon is configured to emit a signal of a fixed signal strength and having a signal frequency which differs from the signal frequency of the other beacons, sensors, each of which is fitted to in each case one of the dairy animals, wherein each sensor is configured to receive the signals emitted by the beacons and to measure the signal strength of each of the received signals, a control unit, which is connected to the sensors for receiving the signal strength of each of the signals emitted by the beacons and measured by the sensors, wherein the control unit is configured to determine the position of the dairy animals on the basis of the signal strength of each of the signals emitted by the beacons and measured by the sensors. The sensors are fitted, for example, in a collar worn by the dairy animals.

The invention also relates to a method for managing a group of dairy animals in a system,
wherein the system comprises:
    a dwelling space, such as an animal shed, in which the dairy animals can roam,
    at least one dairy animal-related device for performing a dairy animal-related operation, wherein the dairy animal-related device is arranged in a fixed position in the dwelling space, and wherein the dairy animals in the dwelling space can walk to the dairy animal-related device through the dwelling space,
    a detection system which is configured to detect the position of each individual dairy animal in the dwelling space,
    a luring system with luring devices, each of which is attached to in each case one of the dairy animals, wherein the luring device of each dairy animal is activatable in order to give off a luring signal to said dairy animal, which is preferably only perceivable by said dairy animal, in order to lure said dairy animal to the dairy animal-related device, wherein the luring system is connected to the detection system in order to receive positions of the dairy animals in the dwelling space detected by the detection system detected positions, and
wherein the method comprises:
    determining the number of dairy animals which are situated in a predetermined area of the dwelling space adjacent to the dairy animal-related device on the basis of the detected positions of the dairy animals in the dwelling space received by the luring system, and
    activating the luring device of one of the other dairy animals by the luring system depending on said number of dairy animals which are situated in said area.

The method according to the invention can be combined with one or more of the features described above for the system according to the invention, either separately or in any desired combination. The method according to the invention also has the same technical effects and advantages as indicated above in the description of the system according to the invention.

The invention will now be explained in more detail with reference to the drawing, in which:

FIG. 1 diagrammatically shows an exemplary embodiment of a system for managing a group of dairy animals according to the invention.

Figure 2:
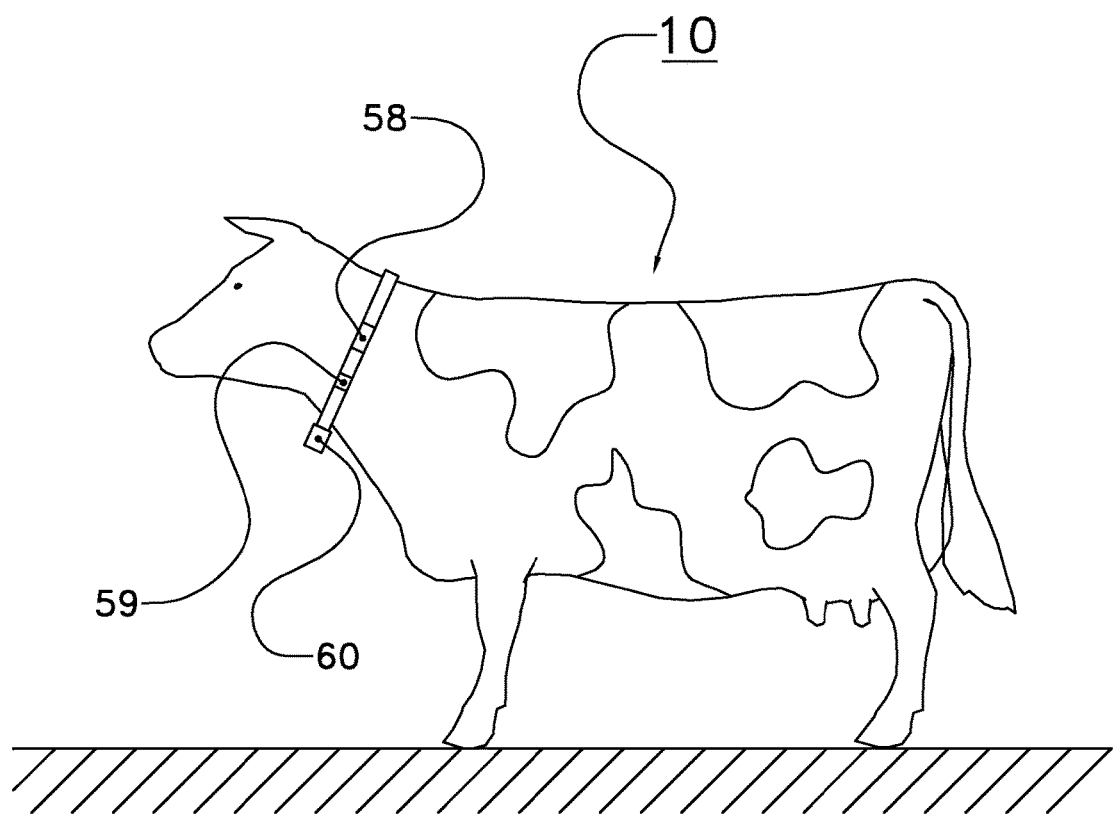

FIG. 2 shows a side view of a dairy animal in the system illustrated in FIG. 1.

The system for managing a group of dairy animals 10 according to the invention is denoted overall in FIG. 1 by reference numeral 1. The system 1 comprises a dwelling space, which is formed by an animal shed. The animal shed comprises a lying and eating space 2 and a milking space 3. On one side of the lying and eating space 2, a feeding fence 6 is placed. Next to the feeding fence 6, a feeding alley 7 extends which forms part of the animal shed. The lying and eating space 2 furthermore comprises, for example, a slatted floor or a closed floor (not shown), a plurality of cubicles 14, a concentrate station 18 and a drinking trough 16. The dairy animals 10 can move freely in the lying and eating space 2, lie in the cubicles 14, eat at the feeding fence 6, eat from the concentrate station 18 and/or drink from the drinking trough 16.

The milking space comprises an automatic milking station 20 for automatically milking each dairy animal 10 from the group of dairy animals 10. The milking station 20 is arranged in the animal shed. Although the dairy animals 10 in this exemplary embodiment can move around substantially freely in the lying and eating space 2, it is also possible for the dairy animals to only reach the milking station 20 via prescribed routes, as is the case with the so-called "forced cow traffic". The milking station 20 comprises a robot arm 22 and a second concentrate trough 24. The milking station 20 comprises an access door 28 and an exit door 30. The access door 28 and exit door 30 are each operable between an open position, as illustrated in the figure, and a closed position (not shown). The access door 28 and exit door 30 together with fencing 26 form a milking area in which a dairy animal 10 can be confined in order to be milked. Although not shown in this exemplary embodiment, the milking space may, for example, furthermore comprise a waiting space.

Each dairy animal 10 has an individually determined milking parameter which, in this exemplary embodiment, depends on the time which has elapsed since the last milking of said dairy animal 10. A dairy animal 10 is milked by the milking station 20 if the individually determined milking parameter of said dairy animal 10 satisfies a predetermined milking criterion. The milking criterion is, for example, that at least a predetermined period, such as at least 6 hours, have to have elapsed since the last milking of said dairy animal 10.

After a dairy animal 10 has been milked in the milking station 20 or, if the dairy animal 10 cannot or should not be milked, some time after the dairy animal 10 has been held in the milking station, the dairy animal 10 is freed by opening the exit door 30. After leaving the milking station 20 via the exit door 30, the dairy animal is guided to a separation device 32 with separation gates 33. By means of the separation gates 33, the dairy animal 10 can be guided selectively back to the lying and eating space 2 or to a separation space 4. The separation space 4 is delimited, for example, by means of fencing 36.

The system 1 is provided with a control system 34. The control system 34 comprises, for example, a computer which is arranged in an office next to the animal shed. The control system 34 is connected to the milking station 20 and to the separation gates 33 (not shown). The control system 34 controls the milking station 20 and also actuates the separation gates 33. Obviously, the control system 34 may be composed of a plurality of control units which, for example, comprise a control unit for actuating the milking station 20 and a control unit for actuating the separation-device 32 (not shown).

In addition, in this exemplary embodiment, the control system 34 is connected to an identification system (not shown) for identifying each dairy animal 10 of the group of dairy animals 10. The identification system comprises, for example, an identification device which is arranged near the access door 28 and/or the feeding trough 24 of the milking station 20. The identification device is configured to cooperate with a transponder 60 which is provided on each dairy animal 10 (see FIG. 2). In this exemplary embodiment, the transponder 60 is fitted in a collar of the dairy animals 10. The transponder may comprise an RFID.

Via a selection device 38, the lying and eating space 2 is connected to an animal space which, in this exemplary embodiment, is formed by a grazing space for the dairy animals 10. In the grazing space, the dairy animals 10 can move freely outdoors and eat grass. In this exemplary embodiment, the selection device 38 comprises an identification device (not shown) for identifying each dairy animal 10 of the group of dairy animals 10, an access fence 44 and a selection fence 42 which is operable between a pass position illustrated in FIG. 1 (grazing position) and a return position, indicated by a dashed line 43. In the return position, the grazing space is closed off by means of the selection fence 42, so that a dairy animal 10 is directed back to the lying and eating space 2. In the pass position, the selection fence 42 provides access to the grazing space 3 and simultaneously the selection fence 42 closes off the lying and eating space 2.

The selection device 38 with the access fence 44 and the selection fence 42 is connected to the control system 34 and is actuated by means of the control system 34. If a dairy animal is located in the selection device 38 and has been identified, the control system 34 controls the selection fence 42 on the basis of the desired milking interval, which is determined by the desired time period between two successive milking operations of said dairy animal, and/or the expected grazing lap time, which is determined by the expected time period which said dairy animal spends in the grazing space before said dairy animal returns to the lying and eating space 2 of its own accord. The selection fence 42 opens, for example, only towards the grazing space for a dairy animal 10 whose last milking operation took place less than a predetermined period ago, wherein the predetermined period is determined on the basis of the desired milking interval for said dairy animal 10. In this case, the chance increases that the dairy animal 10 is located not too far from the milking station 20 when the desired milking interval has elapsed.

According to the invention, the dwelling space 2, 3 comprises a detection system 39 for detecting or following the position and/or movement over time of each individual dairy animal 10 which is situated in the lying and eating space 2 and/or the milking space 3, i.e. the detection system 39 in this exemplary embodiment forms a "cow locator" system.

The "cow locator" system may be configured in different ways. In this exemplary embodiment, the "cow locator" system 39 comprises a number of beacons 40 which are each arranged at a fixed position in the dwelling space 2, 3, at a distance apart. In this exemplary embodiment, the beacons 40 are fitted in the corners of the animal shed, at a level above the dairy animals 10, such as on the roof structure of the animal shed. Each beacon 40 is configured to transmit a signal of a fixed signal strength and having a signal frequency which differs from the signal frequency of the other beacons 40. The dairy animals 10 are fitted with sensors 59, in this exemplary embodiment on the collar of the dairy animals 10 (see FIG. 2). The sensors 59 which the dairy animals 10 have in their collars are configured to receive the signals which are transmitted by the beacons 40 and to measure the signal strength of each of the received signals.

The "cow locator" system 39 comprises a control unit which, in this exemplary embodiment, is incorporated in the control system 34. The control unit of the "cow locator" system 39 is connected to the sensors 59 which are worn by the dairy animals 10 for receiving the signal strength measured by said sensors 59 of each of the signals transmitted by the beacons 40. The control unit 34 of the "cow locator" system 39 is configured to determine the position of the dairy animals 10 on the basis of the signal strength measured by the sensors 59 of each of the signals transmitted by the beacons 40. Thus, the position of the dairy animals 10 in the lying and eating space 2 and/or the milking space 3 can be detected and be followed over time in order to determine the movement of the dairy animals 10 in the animal shed.

According to the invention, the system 1 comprises a luring system with luring devices 58, each of which is attached to one of the dairy animals 10. In this exemplary embodiment, the luring device 58 of each dairy animal 10 comprises a loudspeaker which is fitted to the collar of said dairy animal 10 (see FIG. 2).

The luring device 58 of each dairy animal 10 is activatable in order to emit a first or second luring audio signal by means of the loudspeaker of such a volume that said luring signal is only audible by said dairy animal 10. The first audio luring signal is associated by the dairy animal 10 with the automatic milking station 20 in order to lure said dairy animal 10 to the automatic milking station 20. When the dairy animal 10 hears the second audio luring signal, it is lured to the selection device 38. For example, the association may be taught by sending the first audio luring signal to each dairy animal 10 which voluntarily visits the automatic milking station 20. After a number of visits to the milking station 20, the dairy animal 10 will have been conditioned in such a way that the dairy animal 10 walks to the milking station 20 when it detects the first audio luring signal. The association between the second audio luring signal and the selection device 38 can be taught by sending the second audio luring signal each time the dairy animal 10 has walked to the selection device 38 of its own accord during a training period.

The luring system is connected to the detection system 39 for receiving the positions of the dairy animals 10 in the dwelling space 2, 3 detected by the detection system. The luring system comprises a control unit which, in this exemplary embodiment, is incorporated in the control system 34. Each dairy animal 10 is allocated a ranking parameter on the basis of the ranking of said dairy animal 10 within the group of dairy animals 10. The ranking parameter of each dairy animal 10 is stored in a memory of the control unit 34 of the luring system. The control unit 34 of the luring system is configured to determine the number of dairy animals 10 waiting at the milking station 20 and at the selection device 38 on the basis of the received detected positions of the dairy animals 10 in the dwelling space 2, 3. In this case, the ranking parameter of each of said waiting dairy animals 10 is simultaneously read out of the memory of the control unit 34.

The number of waiting dairy animals 10 is determined by counting the dairy animals 10 which are situated in a predetermined area 50 (see the dashed line in FIG. 1) of the dwelling space 2, 3 which borders the access door 28 of the milking station 20. This area 50 is no demarcated portion, but an area which the dairy animals 10 can freely enter and leave. As illustrated in FIG. 1, five dairy animals 100 are waiting at the access door 28 of the milking station 20. Then, the control unit 34 of the luring system determines whether said number of waiting dairy animals 10C is smaller than a threshold value which corresponds to a maximum permissible number of waiting dairy animals. The threshold value is, for example, a single dairy animal. Since the number of waiting dairy animals 100 at the milking station 20 at the point in time shown in FIG. 1 is greater than the threshold value, the control unit 34 of the luring system does not send an activation signal. It is relatively busy at the milking station 20 and it is not necessary or desired to stimulate one of the other dairy animals 10 further to walk to the milking station 20.

If, at a later point in time, only a single dairy animal 100 is still waiting (not shown) in the dotted area 50, the control unit 34 of the luring system analyzes whether there are one or more other dairy animals 10A in the dwelling space 2, 3 for which the milking parameter satisfies the milking criterion. Such dairy animals 10A, which are ready to be milked, are, for example, in cubicles 14 relatively far from the milking station 20 (on the right in FIG. 1). On the basis of the received detected positions of the dairy animals 10, 10A in the dwelling space 2, 3, the control unit 34 of the luring system then determines whether the various possible routes (diagrammatically denoted by 51, 52, 53) of these dairy animals 10A, which are ready to be milked, to the milking station 20 are blocked by other dairy animals 10B and, if so, by how many dairy animals 10B and which ranking parameter each of these blocking dairy animals 10B has.

For the dairy animal 10A shown at the top in FIG. 1, the passage to the milking station 20 is clear; the route 51 is not blocked by other dairy animals. The same is so true for the route 52 for the dairy animal 10A shown at the bottom in FIG. 1. However, the route 53, via the central path, for the dairy animal 10A in FIG. 1, which is shown along said central path, is blocked by other dairy animals, in this case by a cluster of five dairy animals 10B. The control unit 34 of the luring system is, for example, configured to determine this number of blocking dairy animals 10B by counting the dairy animals 10B which are situated in a predetermined area 54 (see the dashed line in the figure) through which this route 53 extends. In this case, the control unit 34 of the luring system recognizes clusters of dairy animals 10B which are grouped together by counting the dairy animals 10B which are within a predetermined distance from the dairy animals 10B inside the area 54. In this case, the ranking parameter of each of these blocking dairy animals 10B is also read out of the memory of the control unit 34.

Depending on the ranking parameter of the one dairy animal 100 still waiting at the milking station 20 and the ranking parameters of the three dairy animals 10A, the blocked direct route 53 to the milking station 20 for the dairy animal 10A along the central path, and the milking parameters of the dairy animals 10A, the control unit 34 of the luring system selects the dairy animal 10A which is most suitable to be stimulated at that point in time to walk to the milking station 20. For example, the dairy animal 10A, shown at the top in the figure, has a lower ranking within the group of dairy animals than the dairy animal waiting at the milking station 20 and/or said dairy animal 10A has not been milked for the longest period of time. Since the route 51 is in addition unimpeded, the control unit 34 of the luring system sends an activation signal to the luring device 58 of said dairy animal 10A which is such that the loudspeaker of said luring device 58 emits the first audio luring signal to said dairy animal 10A.

However, the system may be programmed differently. Although the route 53 via the central path is blocked by the dairy animals 10B, it is nevertheless possible for the dairy animal 10A which is shown along the central path in the figure to find a clear passage to the milking station 20 via a detour around the routes 51 and 52. If said dairy animal 10A is the one which has not been milked for the longest period of time, the control unit 34 of the luring system may be programmed to nevertheless call said dairy animal 10A. In this case, the ranking parameters of said dairy animal 10A and the dairy animal 10 waiting at the milking station 20 will again be taken into account. Therefore, using the system according to the invention, it is possible to lure a dairy animal 10A, preferably a dairy animal which is desired and/or expected to walk to the milking station 20, to the milking station 20 in an efficient manner.

In a similar manner, one or more dairy animals from the group can be stimulated to go outside via the selection device 38. In this case, the control unit 34 of the luring system for example first analyzes how many waiting dairy animals are in front of the selection device 38 and what the ranking parameter of these waiting dairy animals is. If the number of waiting dairy animals is smaller than a threshold value, the control unit 34 of the luring system determines whether there are, for example, dairy animals in the dwelling space 2, 3 for which the time remaining to the end of the desired milking interval is longer than the expected grazing lap time. On the basis of the detected positions of these dairy animals, the luring system then analyzes if the possible routes to the selection device 38 are clear for these dairy animals. Subsequently, the luring system sends an activation signal to the luring device 58 of the most suitable dairy animal in such a way that the loudspeaker of this luring device 58 emits the second audio luring signal to said dairy animal, i.e. said dairy animal is lured to the selection device 38.

In this exemplary embodiment, the luring device of each dairy animal 10 furthermore comprises a time clock, which is configured to activate said luring device 58 when a time which has been set in the time clock elapses in order to send said dairy animal 10 a third luring audio signal which is associated by said dairy animal with an entrance 61 from the grazing space to the lying and eating space 2 in order to lure said dairy animal back inside. If a dairy animal is sent to the grazing space by the selection device 38, the time clock of the luring device 58 of said dairy animal is set by the selection device 38 to a time which depends on the expected grazing lap time and/or on the time remaining to the end of the milking interval. The dairy animal outside is then sent the third audio luring signal at just the right moment to lure said dairy animal back inside.

The system according to the invention can be used as an alternative or in addition to the milking station 20 and the selection device 38 is used to lure dairy animals 10 to the concentrate station 18 and/or the feeding fence 6. In addition to the milking station 20, the selection device 38, the concentrate station 18 and the feeding fence 6 as examples of dairy animal-related devices, the system according to the invention may comprise one or more other dairy animal-related devices, such as a cow brush. According to the invention, the use of the various facilities in the dwelling space 2, 3 is improved. In particular, according to the invention, dairy animals 10 of a lower ranking make sufficient use of the various facilities, which benefits the health of the group of dairy animals 10 as a whole.

The invention is not limited to the exemplary embodiment illustrated in the drawing. The person skilled in the art can make various modifications which fall within the scope of the invention. The above-described measures may, both separately and in any desired combination, be used with one or more measures according to one or more of the following claims.

The invention claimed is:

1. A system for managing a group of dairy animals, comprising:
   a dwelling space in which the dairy animals can roam;
   at least one dairy animal-related device for performing a dairy animal-related operation, wherein the dairy animal-related device is arranged in the dwelling space, and wherein the dairy animals in the dwelling space can walk to the dairy animal-related device through the dwelling space;
   a luring system with luring devices, each of the luring devices being attached to one of the dairy animals, respectively, wherein the luring device of each dairy animal is activatable in order to give off a luring signal to said dairy animal so as to lure said dairy animal to the dairy animal-related device; and
   a detection system configured to detect the position of each individual dairy animal in the dwelling space,
   wherein the luring system is connected to the detection system for receiving the positions of the dairy animals in the dwelling space detected by the detection system, and
   wherein the luring system is configured to determine, on the basis of the received detected positions of the dairy animals in the dwelling space, the number of dairy animals situated in a predetermined area of the dwelling space adjacent to the dairy animal-related device, and to activate the luring device of one of the other dairy animals depending on said number of dairy animals situated in said area.

2. The system as claimed in claim 1, wherein the luring system is configured to determine whether said number of dairy animals situated in said area is smaller than a threshold value, and, if the luring system determines that said number of dairy animals situated in said area is smaller than said threshold value, to activate the luring device of said other dairy animal.

3. The system as claimed in claim 2, wherein the threshold value is at most five dairy animals.

4. The system as claimed in claim 1, wherein the luring system is configured to select the luring device of said other dairy animal from the group of dairy animals depending on the number of dairy animals which block a route from the position in the dwelling space at which said other dairy animal is situated to the dairy animal-related device.

5. The system as claimed in claim 4, wherein the luring system is configured to determine said number of blocking dairy animals by determining the number of dairy animals situated in a predetermined area of the dwelling space through which said route extends.

6. The system as claimed in claim 1, wherein a ranking parameter is assigned to each dairy animal in the luring system on the basis of the ranking of said dairy animal within the group of dairy animals, wherein the luring system is configured to determine, on the basis of the received detected positions of the dairy animals in the dwelling space, said number of dairy animals situated in a predetermined area of the dwelling space adjacent to the dairy animal-related device and the ranking parameter of each of said dairy animals, and to activate the luring device of said other dairy animal depending on said number of dairy animals situated in said area and/or the ranking parameter of each of these dairy animals and/or the ranking parameter of said other dairy animal.

7. The system as claimed in claim 6, wherein the luring system is configured to select the luring device of said other dairy animal from the group of dairy animals depending on the number of dairy animals which blocks a route from the position in the dwelling space where said other dairy animal is situated to the dairy animal-related device and/or the ranking parameter of said number of blocking dairy animals and/or the ranking parameter of said other dairy animal.

8. The system as claimed in claim 1, wherein the dairy animal-related device comprises an automatic milking station for automatically milking a dairy animal.

9. The system as claimed in claim 8, the milking station is configured to milk a dairy animal if said dairy animal satisfies a predetermined milking criterion, and wherein said other dairy animal is a dairy animal which satisfies the milking criterion.

10. The system as claimed in claim 1, wherein the system is provided with an animal space separate from the dwelling space, and wherein the dairy animal-related device comprises a selection device which connects the dwelling space and the animal space to each other and is operable between a return position, in which a dairy animal which has walked from the dwelling space to the selection device, is guided back to the dwelling space through the selection device, and a pass position, in which a dairy animal which has walked from the dwelling space to the selection device is guided to the animal space through the selection device.

11. The system as claimed in claim 10, wherein each dairy animal has a desired milking interval determined by the desired time period between two successive milking operations of said dairy animal, and wherein each dairy animal has an expected lap time determined by the expected time period which said dairy animal spends in the animal space before said dairy animal returns to the dwelling space of its own accord, and wherein said other dairy animal is a dairy animal in the dwelling space for which the remaining time to the end of the milking interval is longer than the expected lap time.

12. The system as claimed in claim 10, wherein the luring device of each dairy animal comprises a time clock configured to activate said luring device when a time set in the time clock has expired in order to emit a luring signal to said dairy animal in order to lure said dairy animal back to the dwelling space, and wherein the selection device is configured, when guiding a dairy animal through the selection device from the dwelling space to the animal space, to set the time clock of the luring device of said dairy animal to a time which depends on the expected lap time and/or on the remaining time to the end of the milking interval.

13. The system as claimed in claim 1, wherein the dairy animal-related device comprises a feeding fence, and wherein the system is configured to send a fresh-feed signal to the luring system after fresh feed has been provided at the feeding fence, and wherein the luring system is configured to activate the luring device of one of the other dairy animals depending on the number of dairy animals situated adjacent to the feeding fence after a predetermined time period after said fresh-feed signal has been received in the predetermined area of the dwelling space and/or the ranking parameter of each of these dairy animals and/or the ranking parameter of said other dairy animal.

14. The system as claimed in claim 1, wherein the system comprises a plurality of dairy animal-related devices for performing a dairy animal-related operation, and wherein the luring device of each dairy animal is activatable for giving said dairy animal mutually different luring signals in order to lure said dairy animal to one of the dairy animal-related devices, respectively.

15. The system as claimed in claim 1, wherein each luring device comprises a loudspeaker configured to emit a luring audio signal, and wherein the strength of the audio signal is set in such a manner that only the dairy animal to which said luring device is attached hears said audio signal.

16. The system as claimed in claim 1, wherein the detection system is provided with:
a number of beacons, wherein each beacon is arranged at a fixed position in the dwelling space at a distance from the other beacons and wherein each beacon is configured to emit a signal of a fixed signal strength and having a signal frequency which differs from the signal frequency of the other beacons;
sensors, each of the sensors being fitted to one of the dairy animals, respectively, and wherein each sensor is configured to receive the signals emitted by the beacons and to measure the signal strength of each of the received signals; and
a control unit connected to the sensors for receiving the signal strength of each of the signals emitted by the beacons and measured by the sensors, and wherein the control unit is configured to determine the position of the dairy animals on the basis of the signal strength of each of the signals emitted by the beacons and measured by the sensors.

17. A method for managing a group of dairy animals in a system, wherein the system comprises:
a dwelling space in which the dairy animals can roam;
at least one dairy animal-related device for performing a dairy animal-related operation, wherein the dairy animal-related device is arranged in the dwelling space, and wherein the dairy animals in the dwelling space can walk to the dairy animal-related device through the dwelling space;
a detection system configured to detect the position of each individual dairy animal in the dwelling space;
a luring system with luring devices, each of the luring devices being attached to one of the dairy animals, respectively, wherein the luring device of each dairy animal is activatable in order to give off a luring signal to said dairy animal so as to lure said dairy animal to the dairy animal-related device, and wherein the luring system is connected to the detection system for receiving the positions of the dairy animals in the dwelling space detected by the detection system, and
wherein the method comprises:
determining the number of dairy animals situated in a predetermined area of the dwelling space adjacent to the dairy animal-related device on the basis of the detected positions of the dairy animals in the dwelling space received by the luring system; and
activating the luring device of one of the other dairy animals depending on said number of dairy animals situated in said area.

18. The system as claimed in claim 2, wherein the luring system is configured to select the luring device of said other dairy animal from the group of dairy animals depending on the number of dairy animals which block a route from the position in the dwelling space at which said other dairy animal is situated to the dairy animal-related device.

19. The system as claimed in claim 3, wherein the luring system is configured to select the luring device of said other dairy animal from the group of dairy animals depending on the number of dairy animals which block a route from the position in the dwelling space at which said other dairy animal is situated to the dairy animal-related device.

20. The system as claimed in claim 2, wherein a ranking parameter is assigned to each dairy animal in the luring system on the basis of the ranking of said dairy animal within the group of dairy animals, wherein the luring system is configured to determine, on the basis of the received detected positions of the dairy animals in the dwelling space, said number of dairy animals situated in a predetermined area of the dwelling space adjacent to the dairy animal-related device and the ranking parameter of each of said dairy animals, and to activate the luring device of said other dairy animal depending on said number of dairy animals situated in said area and/or the ranking parameter of each of these dairy animals and/or the ranking parameter of said other dairy animal.

\* \* \* \* \*